(12) United States Patent
Clegg

(10) Patent No.: US 12,540,775 B2
(45) Date of Patent: Feb. 3, 2026

(54) HEAT EXCHANGER

(71) Applicant: Robert Louis Clegg, West Yorkshire (GB)

(72) Inventor: Robert Louis Clegg, West Yorkshire (GB)

(*) Notice: Subject to any disclaimer, the term of this patent is extended or adjusted under 35 U.S.C. 154(b) by 0 days.

(21) Appl. No.: 18/650,167

(22) Filed: Apr. 30, 2024

(65) Prior Publication Data

US 2024/0280323 A1 Aug. 22, 2024

Related U.S. Application Data

(63) Continuation of application No. 16/644,969, filed as application No. PCT/AU2018/050983 on Sep. 11, 2018, now Pat. No. 12,000,656.

(30) Foreign Application Priority Data

Sep. 11, 2017 (AU) .................................. 2017903667

(51) Int. Cl.
*F28D 1/02* (2006.01)
*F28D 7/00* (2006.01)
(Continued)

(52) U.S. Cl.
CPC ......... *F28D 1/0213* (2013.01); *F28D 7/0075* (2013.01); *F28D 7/10* (2013.01);
(Continued)

(58) Field of Classification Search
CPC .......... F17C 9/02; F28D 15/02; F28D 1/0226; F28D 15/0266; F28D 2015/0291;
(Continued)

(56) References Cited

U.S. PATENT DOCUMENTS 2,313,087 A * 3/1943 Parr ........................ F28D 15/02
184/104.1
2,819,882 A 1/1958 Stephani
(Continued)

FOREIGN PATENT DOCUMENTS

CN 101245971 A 8/2008
GB 560060 A 3/1944
(Continued)

OTHER PUBLICATIONS

International Search Report and Written Opinion issued in corresponding International Patent Application No. PCT/AU2018/050983 mailed Nov. 2, 2018 (8 pages).
(Continued)

*Primary Examiner* — Frantz F Jules
*Assistant Examiner* — Jason N Thompson
(74) *Attorney, Agent, or Firm* — Kilyk & Bowersox, P.L.L.C.

(57) ABSTRACT

A heat exchanger (10) of heat pipe configuration for transferring heat between a first and second process streams via a heat transfer fluid comprises: at least one first process stream passage (19); at least one second process stream passage (29); and a shell (11) enclosing the first and second process stream passages (19, 29) within a volume (55). The volume (55), as a result of a heat transfer process, is fully filled with both vapour and liquid phases of the heat transfer fluid. The first and second process stream passages (19, 29) are spaced by a disengagement zone (50) enabling gravitational separation of said vapour and liquid phases and limiting accumulation of liquid phase heat transfer fluid about the first process stream passage(s) (19). Such heat exchangers can be used, among other applications, to replace a flash cooling stage in a Bayer process plant.

7 Claims, 8 Drawing Sheets

(51) Int. Cl.
*F28D 7/10* (2006.01)
*F28D 7/16* (2006.01)
*F28D 15/02* (2006.01)
*F28D 21/00* (2006.01)
*F28F 9/22* (2006.01)

(52) U.S. Cl.
CPC ........... *F28D 7/16* (2013.01); *F28D 15/0233* (2013.01); *F28D 15/0266* (2013.01); *F28D 21/0017* (2013.01); *F28F 9/22* (2013.01); *F28D 2021/0066* (2013.01); *F28F 2009/224* (2013.01); *F28F 2210/10* (2013.01)

(58) Field of Classification Search
CPC ........ F28D 21/0017; F28D 7/06; F28D 7/163; F28D 7/0008; F28D 7/0025; F24H 1/22; F28F 9/22; F28F 2009/222; F28F 2009/228; F25B 39/02; F25B 39/028; F25B 39/04; F25B 2339/02; F25B 2339/0242; F25B 2339/04; F25B 2339/046
See application file for complete search history.

(56) References Cited

U.S. PATENT DOCUMENTS

| | | | |
|---|---|---|---|
| 3,746,079 A | 7/1973 | Arenson | |
| 3,798,617 A * | 3/1974 | Varadi | G11C 7/1018 365/240 |
| 3,986,340 A | 10/1976 | Bivins, Jr. | |
| 4,688,399 A | 8/1987 | Reimann | |
| 5,027,891 A * | 7/1991 | Fulford | F28D 15/0266 165/95 |
| 5,103,899 A | 4/1992 | Kalina | |
| 5,839,294 A | 11/1998 | Chiang et al. | |
| 6,026,889 A * | 2/2000 | Pase, Sr. | F28D 15/02 165/104.21 |
| 6,367,429 B2 * | 4/2002 | Iwasaki | F28D 15/02 122/31.1 |
| 2001/0004009 A1 | 6/2001 | MacKelvie | |
| 2008/0149311 A1 | 6/2008 | Liu et al. | |
| 2013/0058725 A1 * | 3/2013 | Duong | F28D 21/0012 405/184.2 |
| 2014/0223936 A1 | 8/2014 | Hartfield et al. | |
| 2015/0007604 A1 | 1/2015 | Hu et al. | |
| 2015/0354873 A1 * | 12/2015 | Hartfield | F25B 40/02 62/119 |
| 2016/0054073 A1 | 2/2016 | Rice | |
| 2018/0084673 A1 | 3/2018 | Asai et al. | |
| 2019/0335622 A1 | 10/2019 | D'Inca et al. | |
| 2020/0284514 A1 | 9/2020 | Clegg | |

FOREIGN PATENT DOCUMENTS

| | | |
|---|---|---|
| WO | 2006083250 A1 | 8/2006 |
| WO | 2009004422 A2 | 1/2009 |
| WO | 2012077143 A1 | 6/2012 |

OTHER PUBLICATIONS

Search Opinion and Supplementary Search Report issued in corresponding European Patent Application No. 18 853 105.7 dated Apr. 28, 2021 (5 pages).

* cited by examiner

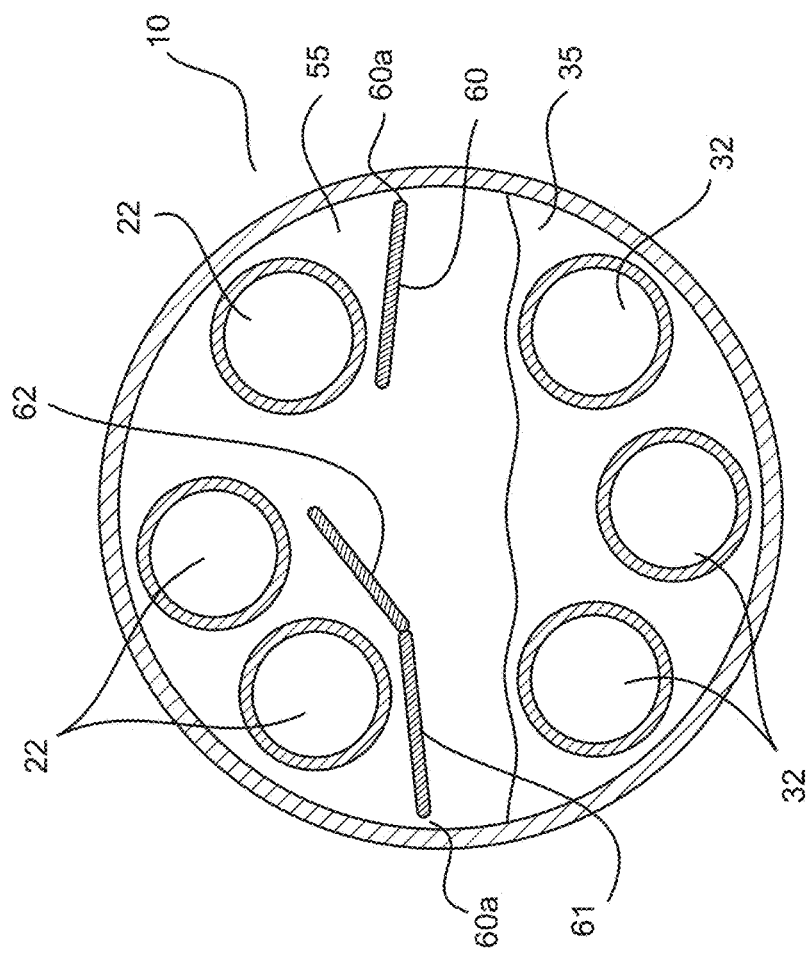
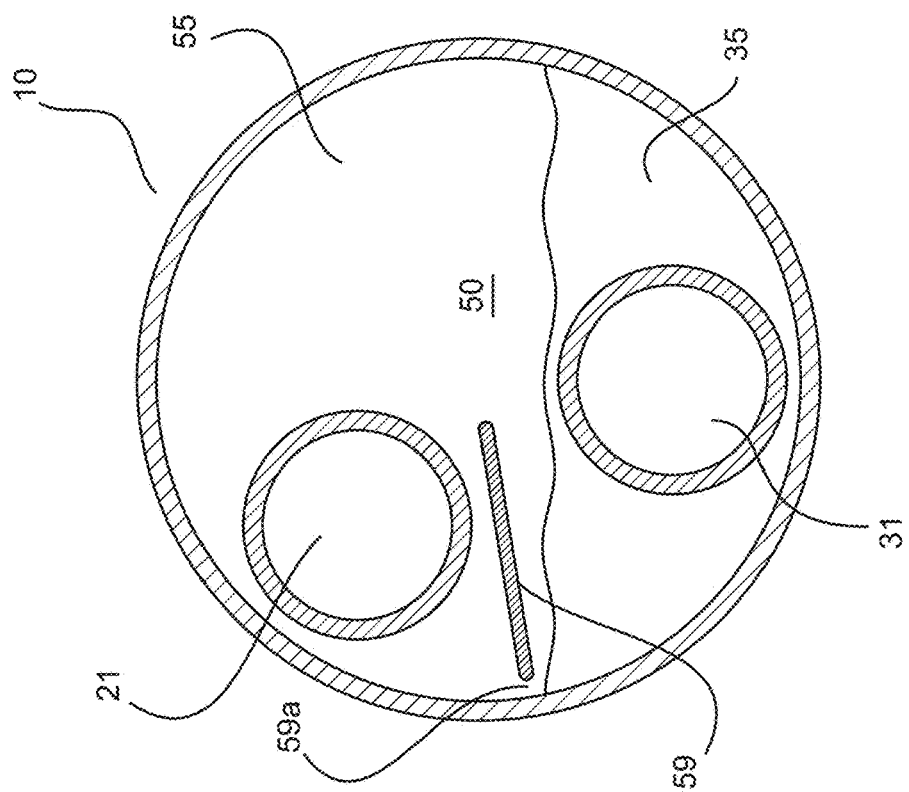
Figure 5
Figure 4

HEAT EXCHANGER

This application is a continuation of U.S. patent application Ser. No. 16/644,969, filed Mar. 6, 2020, which in turn is a National Stage Application of PCT/AU2018/050983, filed Sep. 11, 2018, which claims priority to Australian Patent Application No. 2017903667, filed Sep. 11, 2017.

The invention relates to a heat exchanger and in particular to a thermosyphon heat pipe type heat exchanger.

Heat recovery from slurries and scaling fluids is often conducted by flashing the slurry or fluid to a lower pressure and condensing the flashed vapour in a heat exchanger, heating a cooler process stream.

For example, in alumina refineries with low temperature digestion (at ~145° C.) there are normally 3 digestion flash tanks online, and in high temperature digestion (normally ≥240° C.) there are normally 10 flash tanks online in the digestion section of the alumina refinery. A reasonable temperature drop in a flash tank is 12° C., although it can be higher, especially in high temperature digestion refineries. The refinery liquor typically has a boiling point elevation of 8° C. and the heat exchanger may have an approach temperature as low as 2° C. This means that the net heating in digestion must be at least around 12+8+2° C., or normally more than 22° C., typically ~25° C. in low temperature digestion, and more in high temperature digestion.

Steam from digestion flash tanks invariably contains trace amounts of refinery liquor that contributes to scaling of the outside of the heat exchange tubes, whether they are tubes in a shell and tube heat exchanger, or "tubes" in a jacketed tube digestor. This scale is difficult to remove as it is on the "shell-side" of the heat exchanger or tube digestor.

Flash tanks, due to their geometry and size, are descaled manually by mechanical means; whereas the insides of tubes are easier to clean, either chemically through turbulent flow, or by semi-automatic mechanical means.

In addition to the refinery's high-energy requirement, another disadvantage of flash tanks in digestion is the increasing caustic concentration of the liquor passing through digestion flash tanks which reduces refinery productivity.

Heat recovery from the precipitation slurry of a traditional alumina refinery is not practical as the additional heat cannot be utilised in digestion with the current technology of flash cooling of the digestion slurry and heat exchange to the digestion feed stream. Often refineries even enhance heat loss in the precipitation section of the refinery.

A heat-pipe based heat exchanger, as described in U.S. Pat. No. 5,027,891, can be applied to achieve approach temperatures that are significantly less than 22° C. The heat exchanger is typically a shell and tube heat exchanger with a plurality of conduits and water ($H_2O$, R-718) as the heat transfer fluid. There is no requirement for a wick as the "cold" pipes are located above the "hot" pipes so gravity returns the condensate to the fluid surrounding the "hot" pipes. Unfortunately, the use of a plurality of closely packed tubes, as desired to maximise heat transfer area in a traditional shell and tube heat exchanger, may lead to operability problems as the possibility of flooding of the heat exchanger, as heat transfer fluid accumulates about the "cold" pipes reduces its heat transfer efficiency. To the Applicant's knowledge, the heat exchanger of U.S. Pat. No. 5,027,891 has not been used commercially.

It is an object of the present invention to avoid operability problems such as those due to flooding in a heat exchanger, especially of heat pipe type. Such a heat exchanger could usefully be deployed in industry, for example the alumina industry, but the present invention is not limited to use in alumina refining, or any process that conducts heat recovery via flash tank and heat exchanger.

With this object in view, the present invention provides a heat exchanger of thermosyphon heat pipe configuration for transferring heat between a first process stream and a second process stream through the medium of a heat transfer fluid comprising:

at least one first process stream passage;
at least one second process stream passage; and
a shell enclosing said plurality of first and second process stream passages within a volume, said volume being, as a result of a heat transfer process, fully filled with both vapour and liquid phases of said heat transfer fluid wherein said at least one first process stream passage and said at least one second process stream passage are spaced by a disengagement zone enabling separation of said vapour and liquid phases and limiting accumulation of liquid phase heat transfer fluid about said first process stream passages. Advantageously, the heat exchanger includes a plurality of first and second process stream passages to enhance heat transfer efficiency. A convenient form of passage is contained within a pipe or tube and the terms "passage", "pipe" and "tube" may be used interchangeably in the following description.

The first process stream passages or pipes may contain a stream, preferably a liquor stream, which is to be heated by the condensation of the vapour phase of the heat transfer fluid. The liquor stream may be a slurry. The first process stream passages may be referred to as "cold" pipes. The second process stream passages or pipes then conveniently contain a stream, preferably a liquor stream which is to be cooled by the evaporation of the liquid phase of the heat transfer fluid. The liquor stream may be a slurry. The first process stream pipes are typically located above the second process stream passages with the heat exchanger being a thermosyphon heat pipe heat exchanger. The second process stream pipes may be referred to as "hot" pipes. The diameters of the pipes are selected as small as possible to provide maximum surface area for heat exchange, but without the risk of blockage with a reasonable period of chemical and, or mechanical cleaning, nor too much pressure drop for a conventional hydraulic or pumping system.

The first and second process stream pipes may be arranged in a number of ways. The first and second process stream pipes may have the same arrangement, for example each being arranged in parallel or in a bundle. First and second process stream pipes may also be arranged in discrete groups or bundles having the same or different numbers of pipes in each group. Diameters of the first and second process stream pipes may be the same or different. For instance, the "cold" pipes may have lesser diameter, collectively providing greater surface area, than "hot" pipes. One method is to arrange the first process stream pipes in a conventional shell and tube condenser arrangement, and the second process stream and entrainment disengagement zone in a conventional shell and tube reboiler arrangement. For instance, the tube pitch of the first process stream pipes can be 1.25 of the first process stream pipe diameter, typical of the tube pitch found in conventional shell and tube condensers, whereas the tube pitch of the second process stream can be 1.5 to 2.0 of the second process stream pipe diameter, typical of the tube pitch found in conventional shell and tube reboilers.

The first and second process stream pipes may be separated by one or more baffles arranged in the disengaging zone. Including baffle(s), conveniently in the form of metal plates, would increase the heat load at which a flooding point is reached and may be advantageous dependent on the selected heat transfer fluid. Baffle(s) may be disposed in the heat exchanger to direct vapour and/or condensate along desired paths selected to further minimise flooding risk. To this end, baffle(s) are desirably spaced from the shell by a gap to direct vapour along a path so as to "push" condensate towards the shell away from the rising vapour thus minimising the impact of vapour velocity on flooding the heat exchanger.

Pressure within the first and second process stream pipes is desirably maintained above the vapour pressure of the liquid phase to avoid two phase flow.

The heat exchanger enables disengagement of liquid and vapour phases of said heat transfer fluid by gravity. A wick could be used but should not be necessary. Entrainment separators could be installed in the disengagement zone. The disengaging zone has height and horizontal cross-sectional area sufficient to enable a desired degree of liquid disengagement of condensate from the vapour phase by gravity for a given heat transfer fluid. The disengagement zone can be designed in the same way as the disengagement zone in a conventional shell and tube reboiler, for instance the maximum vapour velocity can be defined by the Souders Brown equation:

$$V = k\sqrt{\frac{\rho_L - \rho_V}{\rho_V}}$$

where: V=maximum heat transfer fluid vapour velocity (m/s)
k=constant (m/s)
$\rho_L$=density of heat transfer fluid liquid (kg/m$^3$)
$\rho_L$=density of heat transfer fluid vapour (kg/m$^3$)
The Souders-Brown equation constant, k can be set to 0.2 m/s similar to that used in a conventional reboiler disengagement zone.

The heat transfer fluid and heat exchanger cross-sectional area are selected so that a heat transfer fluid vapour velocity is sufficient to avoid flooding. The selected heat transfer fluid desirably reduces the vapour upward velocity by selecting one that has a high heat flux (energy flow per horizontal cross-sectional area, e.g. KW/m$^2$) at the normal heat exchanger operating temperature. Preferred parameters include one or more of high heat of evaporation, high vapour pressure, high difference in liquid and vapour density; and high boiling and condensing heat transfer coefficients. The heat transfer fluid can be selected from known refrigerants and heat pipe heat transfer fluids.

First and second process stream pipes may be respectively arranged in discrete vessels, i.e. hot and cold vessels, which communicate through separate passages. One such set of passages may enable vapour to travel from the hot vessel to the cold vessel. Another set of passages could enable condensed heat transfer fluid to return from the cold vessel to the hot vessel.

In such case, a portion of, or all of, the vapour phase may be compressed to increase condensation temperature if desired to increase heat transfer efficiency. Compression increases the vapour pressure, and thus the condensation temperature and so the driving force for heat transfer in the heat exchanger. A combination of compressor and restriction-such as an orifice—respectively on the vapour and condensate of the heat transfer fluid can be used to reduce heat transfer area and, or reduce approach temperature of the heat exchanger system to a smaller value or even to a negative value.

The present invention also provides a process for transferring heat between a first process stream and a second process stream through the medium of a heat transfer fluid in a heat exchanger of heat pipe configuration comprising:
directing a first process stream through at least one first process stream passage;
directing a second process stream through at least one second process stream passage; and
placing a heat transfer fluid in a shell enclosing said first and second process stream passages within a volume, said volume being, as a result of the heat transfer process, fully filled with both vapour and liquid phases of said heat transfer fluid wherein said at least one first process stream passage and said at least one second process stream passage are spaced by a disengagement zone enabling separation of said vapour and liquid phases and limiting accumulation of liquid phase heat transfer fluid about said at least one first process stream passage. Advantageously, the heat exchanger includes a plurality of first and second process stream passages to enhance heat transfer efficiency.

The selection of optimum heat transfer fluids depends, in addition to considerations described above, on the operating temperature range of a process in which the heat exchanger is deployed. Some preferred heat transfer fluids for 100° C., without limitation because a range of refrigerants and heat pipe heat transfer fluids can be used, are water (H$_2$O, R-718), ammonia (NH$_3$, R-717), chloromethane (CH$_3$Cl, R-40), butane (C$_4$H$_{10}$, R-600), chloroethane (C$_2$H$_5$Cl, R-160), and dodecafluoropentane (C$_5$F$_{12}$, R-Apr. 1, 2012). The heat transfer fluid is selected to have a critical point above the desired temperature operating range for a chemical process. The heat transfer medium is conveniently selected to have thermal stability and no formation of scale throughout the heat exchanger operating temperature range. For example, while water (H$_2$O, R-718) could be used as a heat transfer medium operating at 100° C., its selection is not preferable as other fluids, such as ammonia (NH$_3$, R-717) and chloromethane (C$_2$H$_5$Cl, R-160), have a higher heat flux at their flooding point and so are less susceptible to flooding at this temperature.

The heat exchanger and process may be used in a range of industries, for example in hydrometallurgical processes including in the alumina industry where heat exchangers, as described above, may be applied to replace a conventional flash cooling system in a Bayer process plant in which case the first and second process streams may be termed Bayer process streams. The heat exchanger may be included within a tubular reactor, such as a tubular digester used in the alumina industry. The heat exchanger could also be used in other tubular reactors.

The heat exchanger and heat transfer process may be more fully understood from the following description of preferred embodiments thereof. Such description is made with reference to the accompanying drawings in which:
FIG. 1 is a flowsheet for a prior art Bayer process.
FIG. 2 is a flowsheet for a Bayer process including the heat exchanger of embodiments of the present invention.
FIG. 3a is a cross-section of a heat exchanger according to a first embodiment of the present invention.
FIG. 3b is a cross-section of a heat exchanger according to a second embodiment of the present invention.

FIG. 4 is a cross-section of a heat exchanger according to a third embodiment of the present invention and including a baffle.

FIG. 5 is a cross-section of a heat exchanger according to a fourth embodiment of the present invention and including a baffle arrangement.

Figure 1:
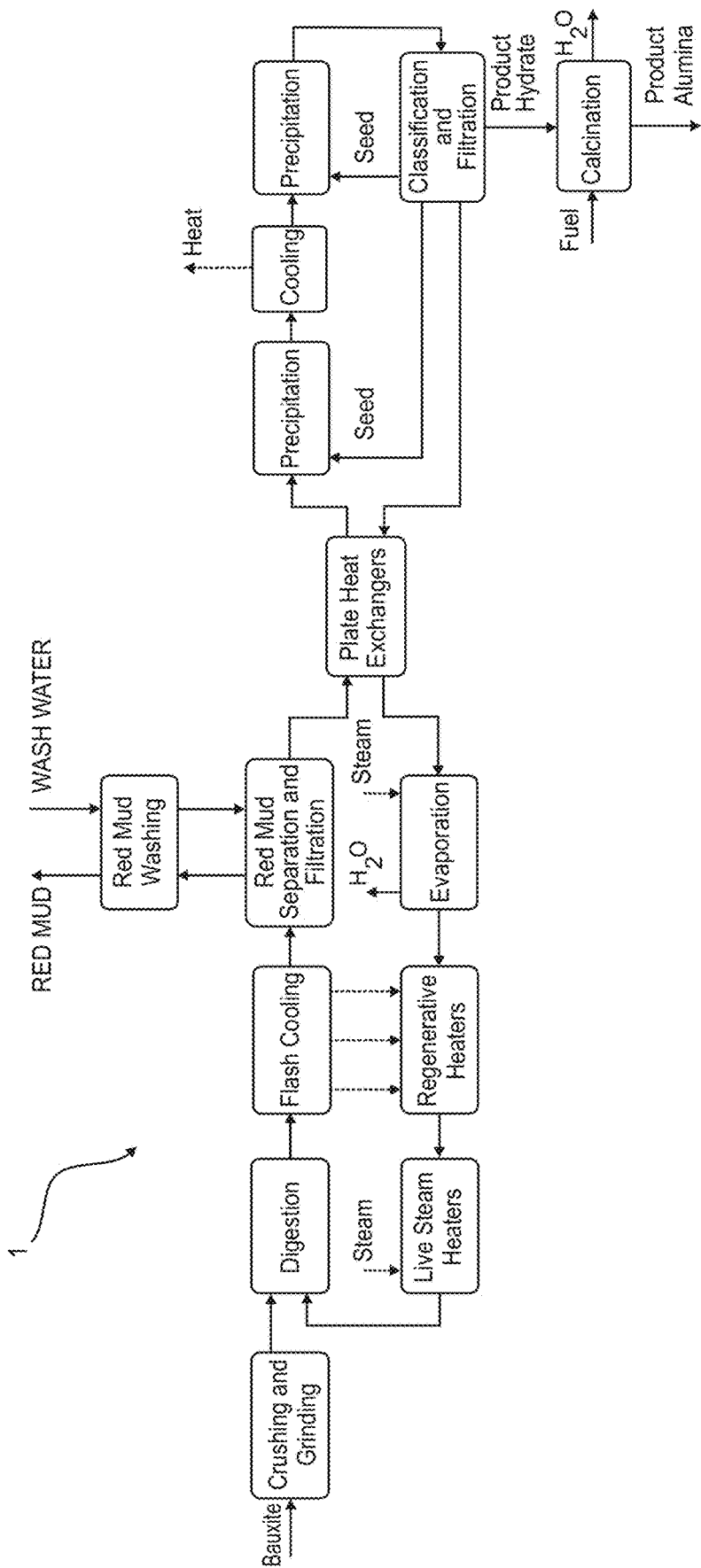

Referring now to FIG. 1, a prior art Bayer process plant 1 employs flash cooling between the digestion stage and red mud separation stages. Bauxite ore is ground and leached with a caustic solution in a heated digester. Low temperature or high temperature digestion processes can be used in accordance with known practice in the art. A slurry comprising a liquor portion containing dissolved sodium aluminate values, and a solid portion made up of undissolved bauxite ore and gangue is then cooled in a flash cooling system which typically requires substantial space. Flash cooling occurs due to successive pressure reduction steps, typically around ten steps in high temperature digestion and three in low temperature digestion, which causes some of the liquor portion to evaporate to steam. This steam is used to heat spent or regenerated liquor, or a slurry of these liquors and bauxite for return to the digester. The heat transfer efficiency in flash cooling is limited by considerations such as those described above, particularly the boiling point elevation and the temperature drop in the flashing stage. Scaling and concentration of the liquor stream can also cause operational efficiency concerns.

Figure 2:
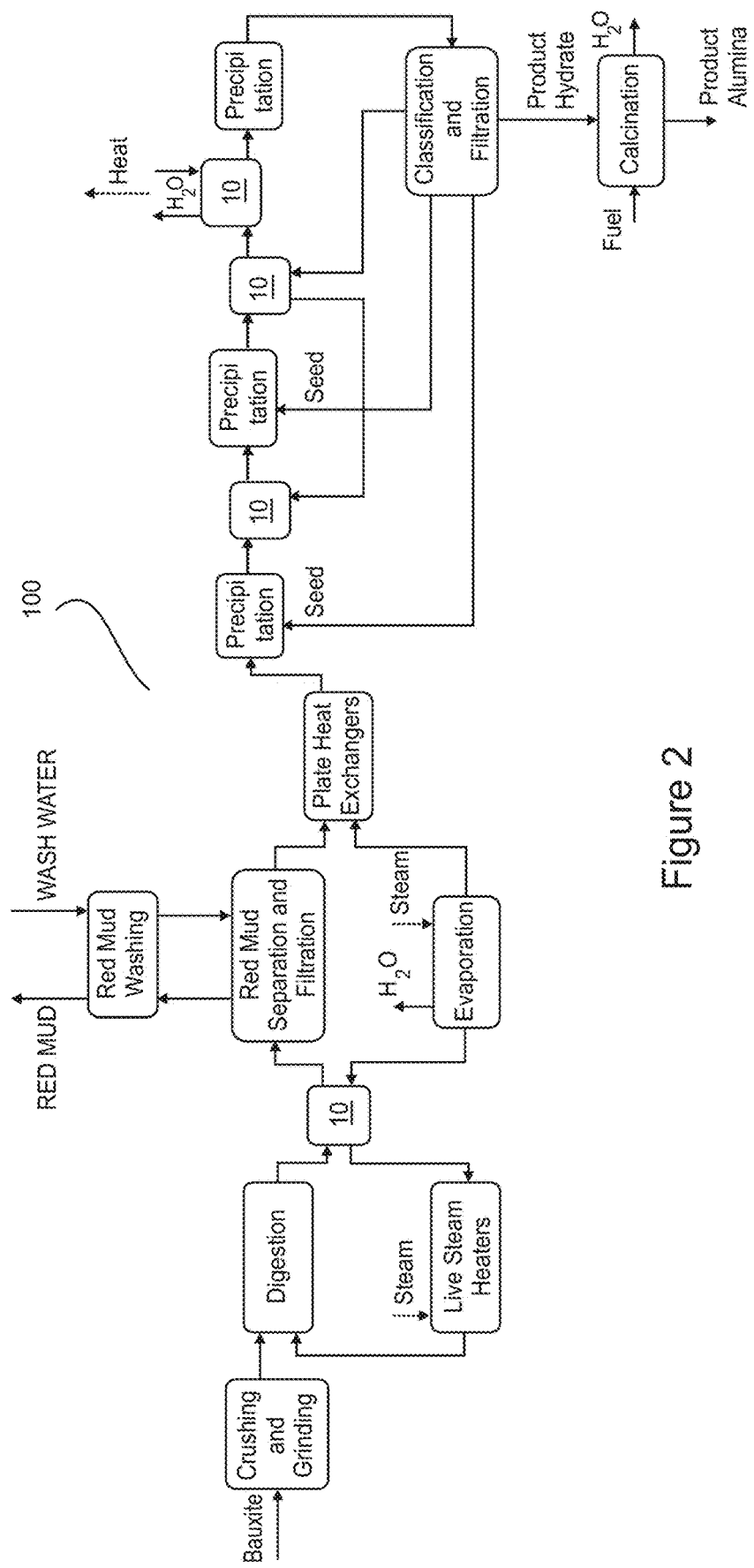

The flash cooling stage of FIG. 1 is replaced with a plurality of heat exchangers 10 in the Bayer process plant 100 of FIG. 2 and notably in the digestion and precipitation sections. Heat exchanger 10 has a heat pipe configuration of thermosyphon type for transferring heat between the hot pregnant liquor stream or slurry containing dissolved sodium aluminate and undissolved bauxite and gangue; and a cooler spent liquor stream or a slurry of spent liquor and bauxite through the medium of a heat transfer fluid. Heat exchanger 10 comprises, as shown in FIGS. 3a to 9, a plurality of first process stream pipes and a plurality of second process stream pipes, all of cylindrical geometry and fabricated from thermally conductive material such as carbon steel, stainless steel, nickel plated or nickel. A cylindrical shell 11 encloses the first and second process stream pipes which extend horizontally within a volume 55 which, as a result of a heat transfer process, is fully filled with both vapour and liquid phases of the heat transfer fluid. The liquid phase of the heat transfer fluid forms a liquid volume 35 in which the first process stream pipes are fully immersed. The heat transfer fluid is selected taking the following considerations into account. Depending on the operating temperature, water ($H_2O$, R-718) may not be the preferred heat transfer fluid for the application due to its propensity to cause flooding of heat exchanger 10 at lower heat transfer flux than other possible heat transfer fluids. Such heat transfer fluids may, for example and without limitation, be selected from refrigerants and heat pipe heat transfer fluids the group consisting of ammonia ($NH_3$, R-717), chloromethane ($CH_3Cl$, R-40), propane ($C_3H_8$, R-290)), butane ($C_4H_{10}$, R-600), chloroethane ($C_2H_5Cl$, R-160), octafluoropropane ($C_3F_8$, R-218) and dodecafluoropentane ($C_5F_{12}$, R-Apr. 1, 2012) may be preferred to address such issues.

The heat transfer fluid partially vapourises as heat is transferred from the hot pipes to the heat transfer fluid. Saturated vapour with heat transfer fluid rises to the disengagement zone, where mainly heat transfer vapour then rises towards the cold pipes and condenses so latent heat of vaporisation is transferred from the heat transfer fluid to the cold pipes. Spent liquor or spent liquor and bauxite slurry are heated in this process.

The plurality of first process stream pipes and the plurality of second process stream pipes are spaced by a disengagement zone 50 of height and horizontal cross-section sufficient to enable separation of said vapour and liquid phases by gravity and limiting accumulation of liquid phase heat transfer fluid about said first process stream pipes.

In FIG. 2, the cooling in precipitation is replaced by the heat exchanger 10 where precipitation slurry is the "hot" process stream and spent liquor is the "cold" process stream. If the heat balance of the process requires it, a heat exchanger 10 can be used where precipitation slurry is the hot stream and a cooling fluid such as cooling water can be the "cold" stream.

Figure 3B:
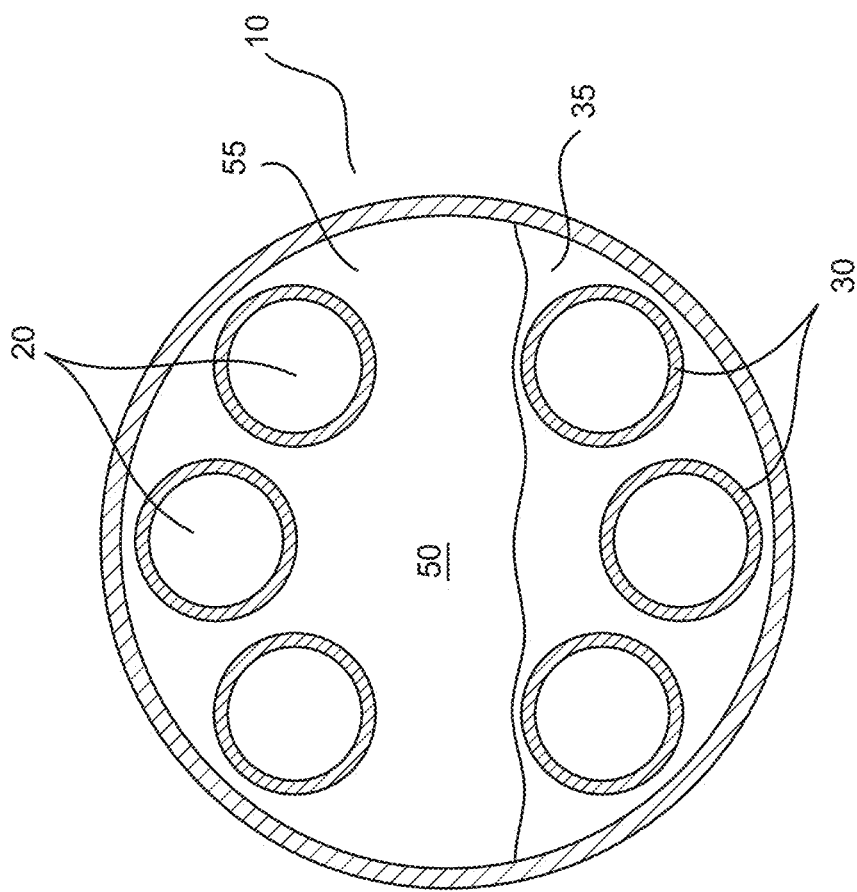
Figure 3A:
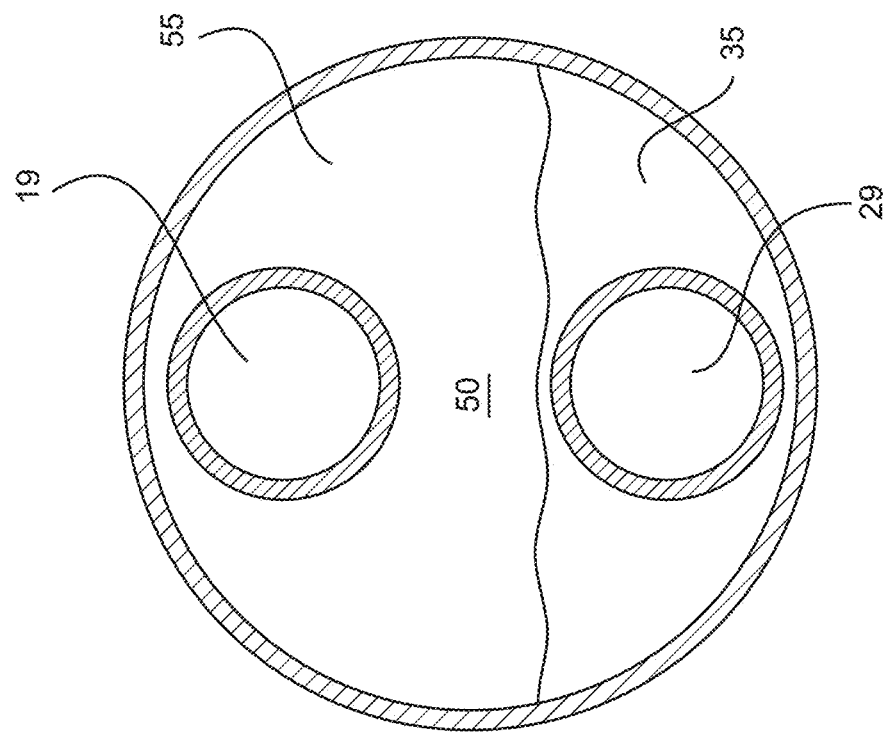

FIG. 3a shows a heat exchanger 10 with a single hot pipe 29 and single cold pipe 19. Heat transfer efficiency would be improved, in most cases, by providing a plurality of hot pipes and a plurality of cold pipes.

FIG. 3b shows heat exchanger 10 with three hot pipes 30 and three cold pipes 20, all of the same diameter, sufficient to avoid blocking due to scale formation. Hot pipes 30 and cold pipes 20 are arranged in the same manner.

FIG. 4 shows a heat exchanger 10 containing a hot pipe 31 separated from cold pipe 21 by a baffle 59 in the form of a metal plate. Hot pipe 31 and cold pipe 21 have the same diameter. Baffle 59 increases the heat load at which a flooding point is reached by directing the vapour in such a way as to "push" the condensate towards the outer perimeter of the outer shell 11 and through small gap 59a; thus, minimising the impact of vapour velocity on flooding the heat exchanger 10. The condensate will tend to return by gravity to the base of the outer shell 11 via the small gap 59a purposefully disposed between the baffle 59 and the outer shell 11. It will be understood that the dimensions of gap 59a may be selected to obtain the desired condensate flow behaviour.

FIG. 5 shows a heat exchanger 10 having three hot pipes 32 and three cold pipes 22, all having the same diameter. Baffles 60, 61 and 62 separate the hot pipes 32 from the cold pipes 22. Baffles 61 and 62 co-operate in an arrangement aimed to increase the heat load at which a flooding point is reached by directing the vapour along a path as to "push" the condensate towards the outer perimeter of the outer shell 11; thus, minimising the impact of vapour velocity on flooding the heat exchanger 10. The condensate will tend to return by gravity to the base of the outer shell 11 via small gaps 60a purposefully disposed between the baffles 60 and 61; and baffle 62 of the outer shell 11. It will again be understood that the dimensions of gaps 60a may be selected to obtain the desired condensate flow behaviour.

Figure 6:
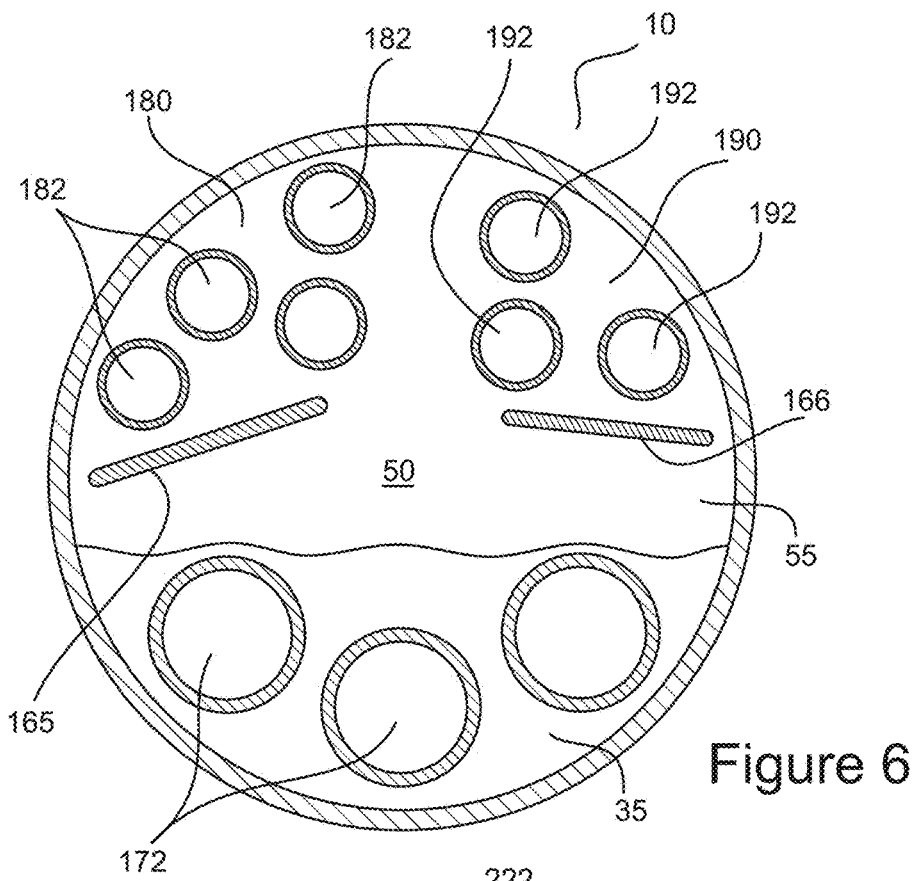
FIG. 6 is a cross-section of a heat exchanger according to a fifth embodiment of the present invention and including a baffle arrangement.

FIG. 6 shows a heat exchanger 10 in which cold pipes are arranged in two discrete groups or bundles 180 and 190, with cold pipes 182 and 192, in this case, all having the same diameter. Bundles 180 and 190 are separated from a bundle of hot pipes 190 by baffles 165 and 166 for increasing the heat load at which a flooding point is reached. Hot pipes 172 have greater diameter than the cold pipes 182 and 192, for example having 2" diameter compared with 1" diameter. Hot pipes 182 carry the scaling pregnant liquor including erosive solids.

Figure 7:
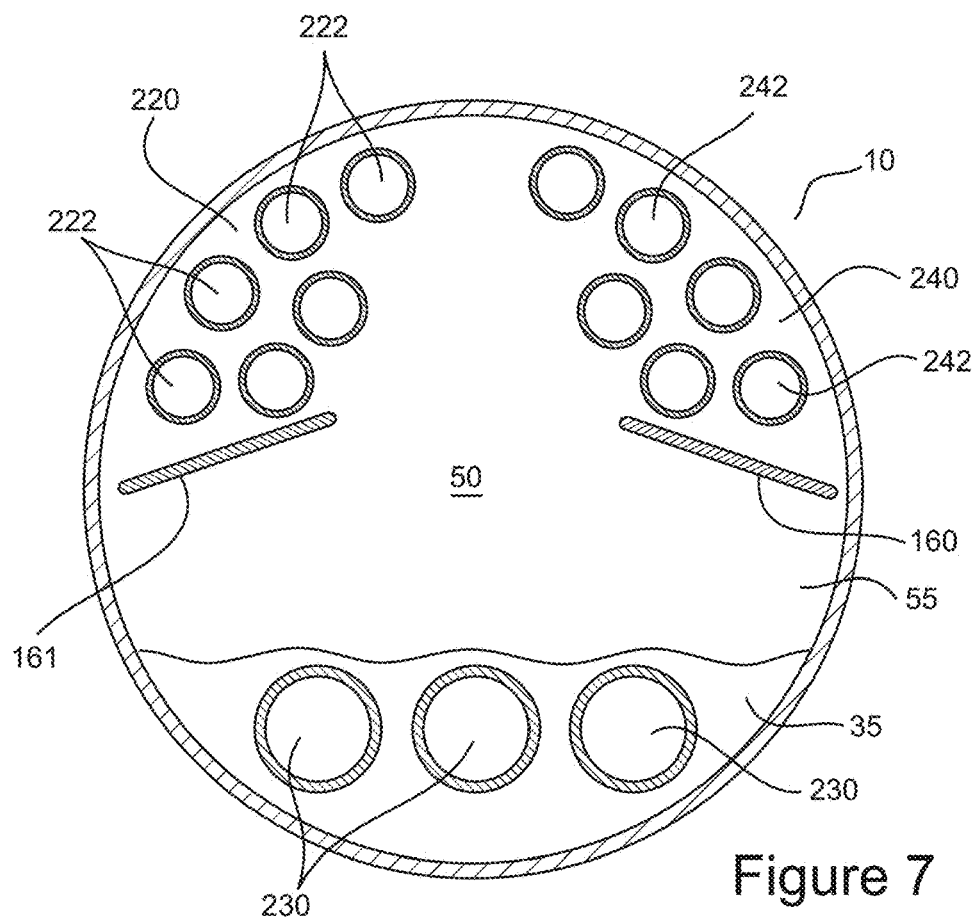
FIG. 7 is a cross-section of a heat exchanger according to a sixth embodiment of the present invention and including a baffle arrangement.

FIG. 7 shows a heat exchanger 10 in which cold pipes are arranged in two groups or bundles 220 and 240, with cold pipes 222 and 242 all having the same diameter. Bundles 220 and 240 are separated from a bundle of three hot pipes 230 by baffles 160 and 161 for increasing the heat load at which a flooding point is reached. Hot pipes 172, which are disposed horizontally and in parallel, have greater diameter than the cold pipes 222 and 242, for example having 2" diameter compared with 1" diameter. Hot pipes 230 carry the scaling pregnant liquor including erosive solids. As the heat exchangers 10 of FIGS. 6 and 7 have similar operating conditions and the heat exchanger 10 in FIG. 7 has more "cold" pipes 222 and 242, the width of the outer shell 11 has to be wider to allow for the higher heat load, and thus higher volume of vapour rising with same heat transfer fluid and thus the same flooding point upward velocity.

Figure 8:
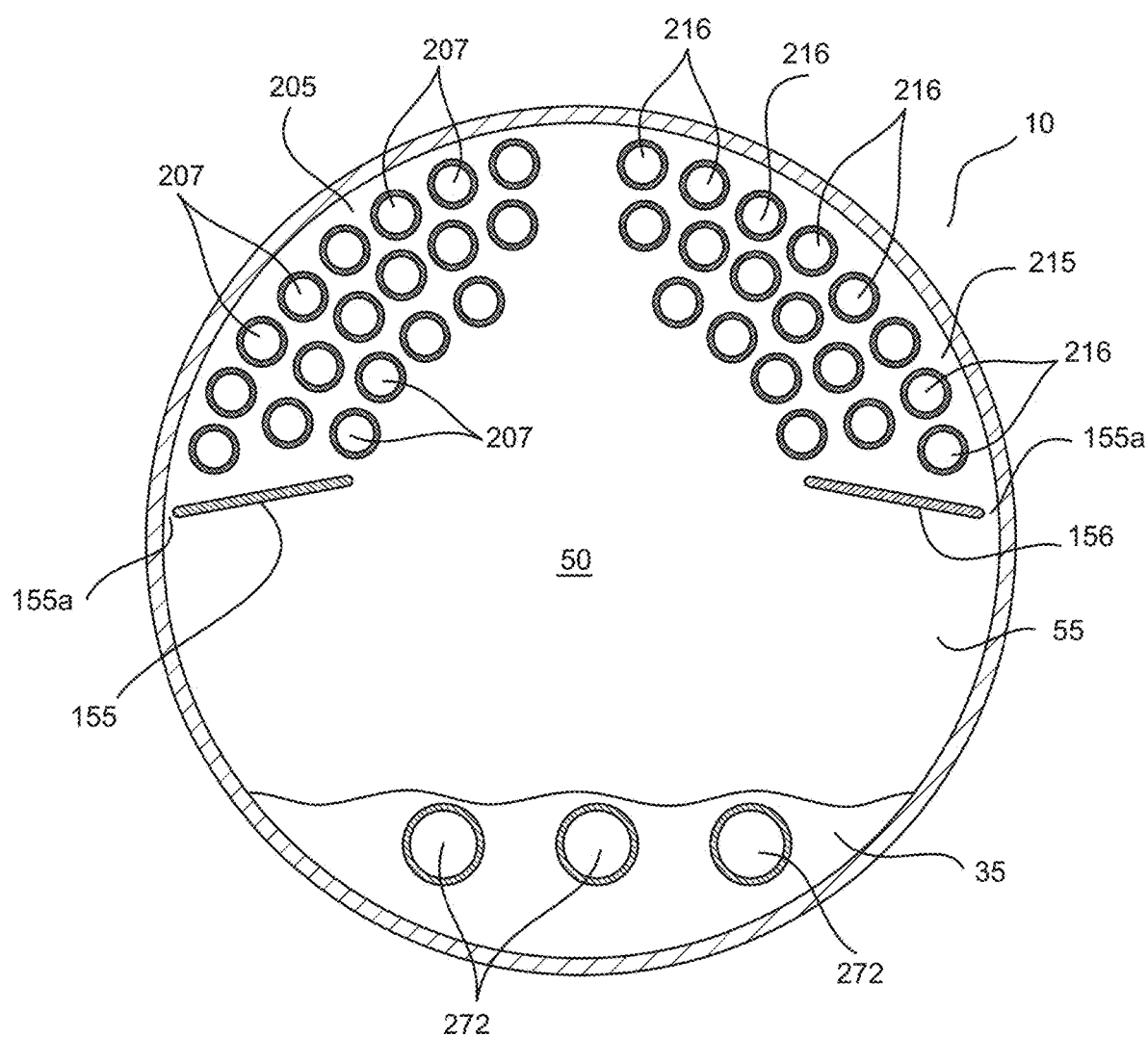
FIG. 8 is a cross-section of a heat exchanger according to a seventh embodiment of the present invention and including a baffle arrangement

FIG. 8 is an embodiment where the number of cold pipes 207 and 216 is higher than in FIG. 7 because of more than one pass through the heat exchanger 10. FIG. 8 shows a heat exchanger 10 in which cold pipes are arranged in two groups or bundles 205 and 215, with cold pipes 207 and 216 all having the same diameter. Bundles 205 and 215 are separated from hot pipes 230 by two relatively small (in comparison to volume 55) baffles 155 and 156 for increasing the heat load at which a flooding point is reached. Hot pipes 272, which are disposed horizontally and in parallel, have greater diameter than the cold pipes 207 and 216, for example having 2" diameter compared with 1" diameter. Hot pipes 272 carry the pregnant liquor including erosive and scaling solids. This arrangement enables the logarithmic average temperature difference (LMTD) on the cold pipes 207 and 216 to be reduced while the LMTD on the hot pipes 272 is increased compared to the heat exchanger in FIG. 7.

Figure 9:
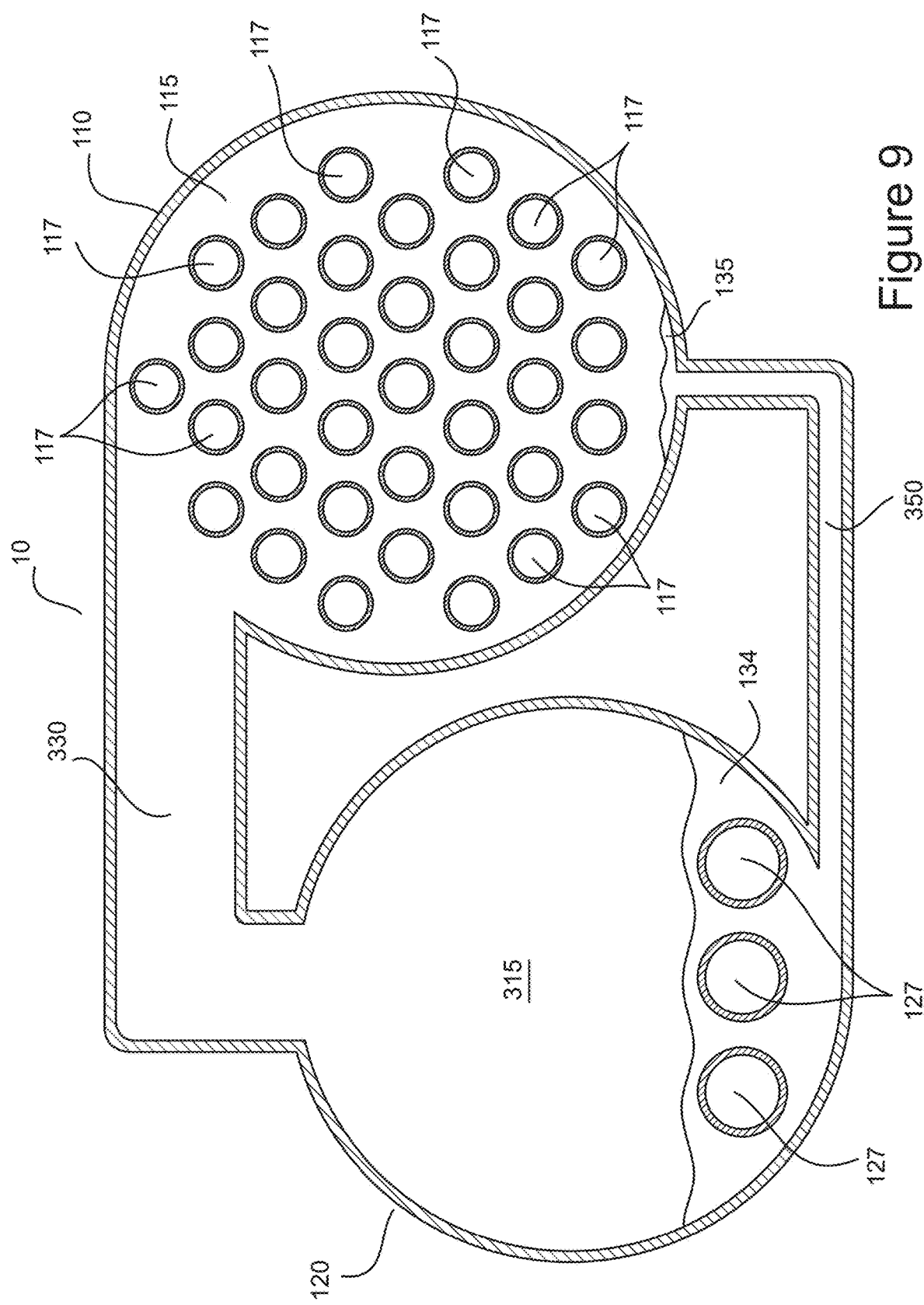
FIG. 9 is a cross-section of a heat exchanger in which first and second process stream passages are arranged in two separate vessels.

FIG. 9 shows a two-vessel arrangement for the heat exchanger 10 which could also be considered a heat exchanger system. Three hot pipes 127 are arranged horizontally and in parallel within hot vessel 120. The hot pipes 127 may, for example, be 2" in diameter. Vapour from evaporating heat transfer fluid body 134 rises through the vapour-liquid disengagement volume 315 to be carried through vapour passage 330 into cold vessel 110 which contains a bundle 115 of cold pipes 117 having, for example, 1" diameter. This arrangement has the advantage of the vapour "pushing" the heat transfer fluid condensate towards the bottom of vessel 110. The condensed heat transfer fluid returns to hot vessel 120 through heat transfer fluid return passage 350.

While the 1" diameter pipes, mentioned by way of example above, may carry scaling fluids, solids are either absent or very fine, for example carrying the spent liquor in an alumina refinery. Scaling may also readily be addressed by methods known in the art of shell and tube heat exchangers. Mechanical de-scaling can be avoided.

Conventional entrainment separators (not drawn) can be installed in the vapour-liquid disengagement volume 315 to further increase heat load at which flooding occurs. These entrainment separators could be, but not limited to, mesh and, or chicane type. Within conduit 330 further entrainment separation can be conducted (not drawn), for instance, cyclones where the separated heat transfer liquid is returned to heat transfer body 134.

Figure 10:
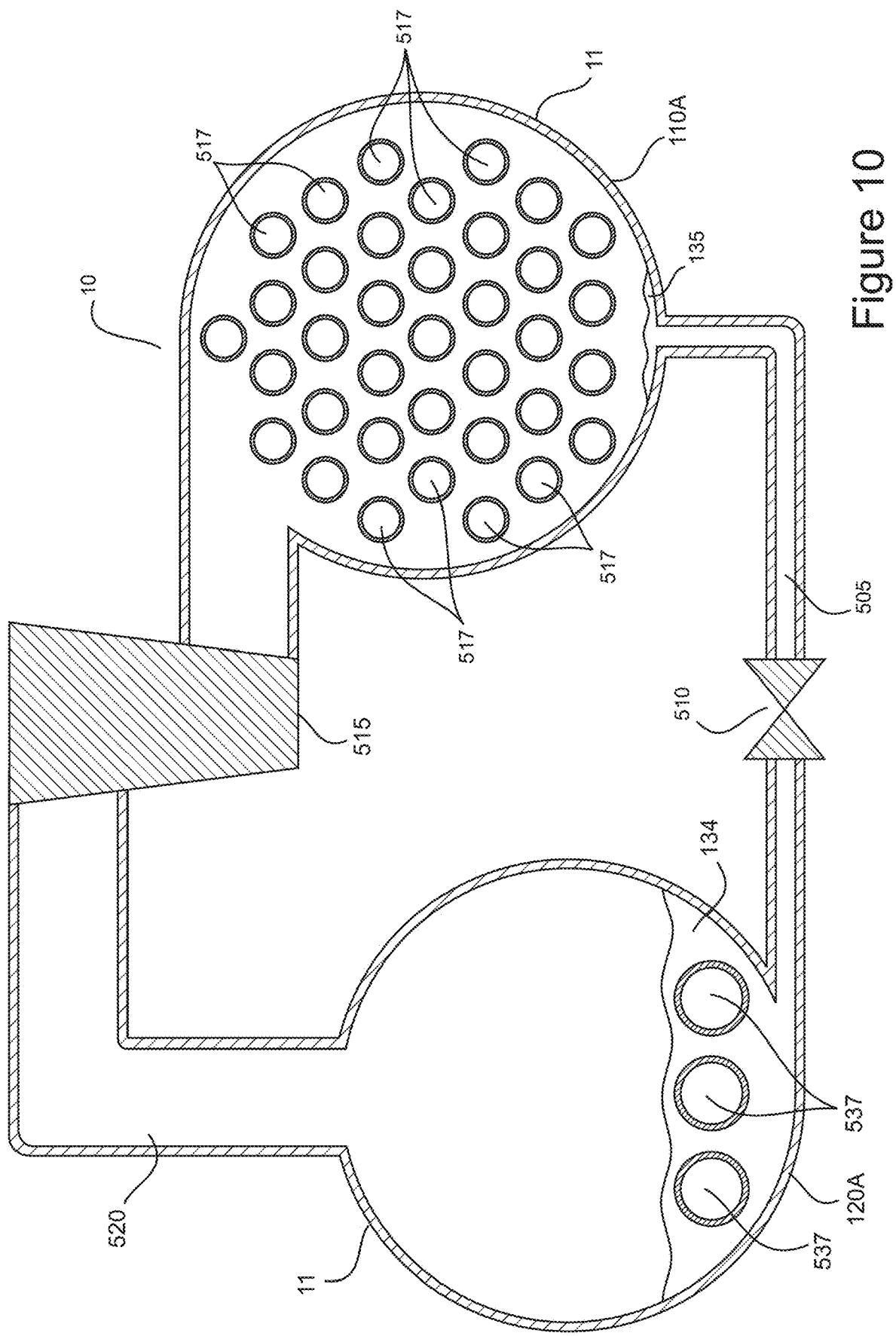
FIG. 10 is a cross-section of a heat exchanger in which there is a compressor in the vapour stream and a restriction in the liquid line between the first and second process stream passages are arranged in two separate vessels.

FIG. 10 shows a similar heat exchanger 10 to that shown in FIG. 9 except that it has a compressor 515 on the vapour passage 520 and a restriction 505, such as an orifice or control valve, on the condensate return passage. Hot vessel 120A has hot pipes 537. Cold vessel 110A has a significantly larger number of smaller diameter cold pipes 517. The combined deployment of compressor 515 and orifice or control valve 505 produces a higher temperature difference so the heat transfer area can be reduced or a smaller, and even a negative, temperature difference between the "hot" and "cold" streams can be handled.

In each of the cases described above, the disengagement zone can be designed in the same way as the disengagement zone in a conventional shell and tube reboiler, for instance the maximum vapour velocity can be defined by the Souders Brown equation:

$$V = k\sqrt{\frac{\rho_L - \rho_V}{\rho_V}}$$

where: V=maximum heat transfer fluid vapour velocity (m/s)

k=constant (m/s)

$\rho_L$=density of heat transfer fluid liquid (kg/m$^3$)

$\rho_L$=density of heat transfer fluid vapour (kg/m$^3$)

The Souders-Brown equation constant, k can be set to 0.2 m/s similar to that used in a conventional reboiler disengagement zone.

The heat transfer efficiency of heat exchanger 10 is greater than achieved through conventional flash cooling and, in the context of an alumina refinery, allows a greater productivity to be achieved with a smaller plant footprint, the latter potentially reducing process plant construction cost. It will be understood that the heat exchanger could be used for other hydrometallurgical and chemical applications.

Modifications and variations to the heat exchanger and heat transfer process as described in the present specification may be apparent to the skilled reader of this disclosure. Such modifications and variations are deemed within the scope of the present invention.

The invention claimed is:

1. A tubular digester comprising a heat exchanger of thermosyphon heat pipe configuration for transferring heat between a first process stream and a second process stream through the medium of a heat transfer fluid, the heat exchanger comprising:
   a closed shell comprising a wall, an upper portion, a lower portion, and a horizontal diameter, the closed shell enclosing a volume fully filled with a vapour phase and a liquid phase of said heat transfer fluid medium, said heat transfer fluid medium being confined within said volume, the horizontal diameter being a longest chord of a circular region of the closed shell and being parallel to a liquid surface of the liquid phase, the closed shell further comprising:
   a condenser comprising a plurality of first process stream passages in the form of straight tubes;
   a reboiler comprising a plurality of second process stream passages in the form of straight tubes, said condenser being arranged above said reboiler, wherein a disengagement zone has height and horizontal cross-sectional area sufficient to enable separation of said vapour phase and said liquid phase by gravity, said disengagement zone spacing a first bundle of said plurality of first process stream passages of said condenser from a second bundle of said plurality of second process stream passages of said reboiler by a gap which has height greater than a tube pitch of the second process stream passages such that said first bundle is discrete and separate from said second bundle, said first bundle is located at the upper portion of the closed shell such that a distance from the first bundle to the horizontal diameter is greater than a distance from the first bundle to the wall of the closed shell at the upper portion, said second bundle being located at the lower portion of the closed shell such that a distance from the second bundle to the horizontal diameter is greater than a distance from the second bundle to the wall of the closed shell at the lower portion, and said first bundle is at a greater distance from said separation of said vapour phase and said liquid phase than said second bundle, and said heat transfer fluid medium and heat exchanger horizontal cross-sectional area are selected so that heat transfer fluid medium vapour velocity is sufficient to avoid flooding of the heat exchanger.

2. An alumina plant comprising a cooling system comprising a plurality of heat exchangers arranged in series, each of the plurality of heat exchangers being of thermosyphon heat pipe configuration for transferring heat between a first process stream and a second process stream through the medium of a heat transfer fluid, each of the plurality of heat exchangers comprising:

a closed shell comprising a wall, an upper portion, a lower portion, and a horizontal diameter, the closed shell enclosing a volume fully filled with a vapour phase and a liquid phase of said heat transfer fluid medium, said heat transfer fluid medium being confined within said volume, the closed shell further comprising:

a condenser comprising a plurality of first process stream passages in the form of straight tubes;

a reboiler comprising a plurality of second process stream passages in the form of straight tubes, said condenser being arranged above said reboiler, wherein a disengagement zone has height and horizontal cross-sectional area sufficient to enable separation of said vapour phase and said liquid phase by gravity, said disengagement zone spacing a first bundle of said plurality of first process stream passages of said condenser from a second bundle of said plurality of second process stream passages of said reboiler by a gap which has height greater than a tube pitch of the second process stream passages such that said first bundle is discrete and separate from said second bundle, said first bundle is located at the upper portion of the closed shell such that a distance from the first bundle to the horizontal diameter is greater than a distance from the first bundle to the wall of the closed shell at the upper portion, said second bundle being located at the lower portion of the closed shell such that a distance from the second bundle to the horizontal diameter is greater than a distance from the second bundle to the wall of the closed shell at the lower portion, and said first bundle is at a greater distance from said separation of said vapour phase and said liquid phase than said second bundle, and said heat transfer fluid medium and heat exchanger horizontal cross-sectional area are selected so that heat transfer fluid medium vapour velocity is sufficient to avoid flooding of the heat exchanger.

3. The alumina plant of claim 2, wherein said plurality of heat exchangers are arranged for cooling slurry from digestion and preheating digestion feed.

4. The alumina plant of claim 2, wherein said plurality of heat exchangers are arranged for cooling in an alumina trihydrate precipitation stage of the alumina plant and preheating spent liquor.

5. The alumina plant of claim 2, wherein said condenser and said reboiler are respectively arranged in discrete hot and cold vessels defined by the closed shell and communicating through separate passages, one set of passages enabling vapour to travel from the hot vessel to the cold vessel, another set of passages enabling condensed heat transfer fluid to return from the cold vessel to the hot vessel.

6. An alumina plant comprising a cooling system comprising a plurality of heat exchangers arranged in series, said plurality of heat exchangers comprising:

at least one plate heat exchanger; and at least one heat exchanger of thermosyphon heat pipe configuration for transferring heat between a first process stream and a second process stream through the medium of a heat transfer fluid, said heat exchanger comprising:

a closed shell comprising a wall, an upper portion, a lower portion, and a horizontal diameter, the closed shell enclosing a volume fully filled with a vapour phase and a liquid phase of said heat transfer fluid medium, said heat transfer fluid medium being confined within said volume, the closed shell further comprising:

a condenser comprising a plurality of first process stream passages in the form of straight tubes;

a reboiler comprising a plurality of second process stream passages in the form of straight tubes, said condenser being arranged above said reboiler, wherein a disengagement zone has height and horizontal cross-sectional area sufficient to enable separation of said vapour phase and said liquid phase by gravity, said disengagement zone spacing a first bundle of said plurality of first process stream passages of said condenser from a second bundle of said plurality of second process stream passages of said reboiler by a gap which has height greater than a tube pitch of the second process stream passages such that said first bundle is discrete and separate from said second bundle, said first bundle is located at the upper portion of the closed shell such that a distance from the first bundle to the horizontal diameter is greater than a distance from the first bundle to the wall of the closed shell at the upper portion, said second bundle being located at the lower portion of the closed shell such that a distance from the second bundle to the horizontal diameter is greater than a distance from the second bundle to the wall of the closed shell at the lower portion, and said first bundle is at a greater distance from said separation of said vapour phase and said liquid phase than said second bundle, and said heat transfer fluid medium and heat exchanger horizontal cross-sectional area are selected so that heat transfer fluid medium vapour velocity is sufficient to avoid flooding of the heat exchanger.

7. A cooling system comprising a plurality of heat exchangers arranged in series, each of the plurality of heat exchangers being of thermosyphon heat pipe configuration for transferring heat between a first process stream and a second process stream through the medium of a heat transfer fluid, each of the plurality of heat exchangers comprising:
- a closed shell comprising a wall, an upper portion, a lower portion, and a horizontal diameter, the closed shell enclosing a volume fully filled with a vapour phase and a liquid phase of said heat transfer fluid medium, said heat transfer fluid medium being confined within said volume, the closed shell further comprising:
- a condenser comprising a plurality of first process stream passages in the form of straight tubes;
- a reboiler comprising a plurality of second process stream passages in the form of straight tubes, said condenser being arranged above said reboiler, wherein
- a disengagement zone has height and horizontal cross-sectional area sufficient to enable separation of said vapour phase and said liquid phase by gravity, said disengagement zone spacing a first bundle of said plurality of first process stream passages of said condenser from a second bundle of said plurality of second process stream passages of said reboiler by a gap which has height greater than a tube pitch of the second process stream passages such that said first bundle is discrete and separate from said second bundle, said first bundle is located at the upper portion of the closed shell such that a distance from the first bundle to the horizontal diameter is greater than a distance from the first bundle to the wall of the closed shell at the upper portion, said second bundle being located at the lower portion of the closed shell such that a distance from the second bundle to the horizontal diameter is greater than a distance from the second bundle to the wall of the closed shell at the lower portion, and said first bundle is at a greater distance from said separation of said vapour phase and said liquid phase than said second bundle, and
- said heat transfer fluid medium and heat exchanger horizontal cross-sectional area are selected so that heat transfer fluid medium vapour velocity is sufficient to avoid flooding of the heat exchanger.

* * * * *